MULTIPLYING MECHANISM

Filed Nov. 29, 1950

5 Sheets-Sheet 1

INVENTOR
EDWARD DAWSON
BY Herbert H. Thompson
his ATTORNEY.

INVENTOR
EDWARD DAWSON
BY
Herbert J. Thompson
his ATTORNEY.

Jan. 6, 1953

E. DAWSON 2,624,506

MULTIPLYING MECHANISM

Filed Nov. 29, 1950

5 Sheets-Sheet 3

INVENTOR
EDWARD DAWSON
BY
Herbert H. Thompson
his ATTORNEY.

Jan. 6, 1953 E. DAWSON 2,624,506

MULTIPLYING MECHANISM

Filed Nov. 29, 1950 5 Sheets-Sheet 4

INVENTOR
EDWARD DAWSON
BY
Herbert H. Thompson
his ATTORNEY.

Jan. 6, 1953 E. DAWSON 2,624,506

MULTIPLYING MECHANISM

Filed Nov. 29, 1950 5 Sheets-Sheet 5

INVENTOR
EDWARD DAWSON
BY
ATTORNEY.

Patented Jan. 6, 1953

2,624,506

UNITED STATES PATENT OFFICE 2,624,506

MULTIPLYING MECHANISM

Edward Dawson, New York, N. Y., assignor to The Sperry Corporation, a corporation of Delaware Application November 29, 1950, Serial No. 198,198

10 Claims. (Cl. 235—61)

Figure 1:
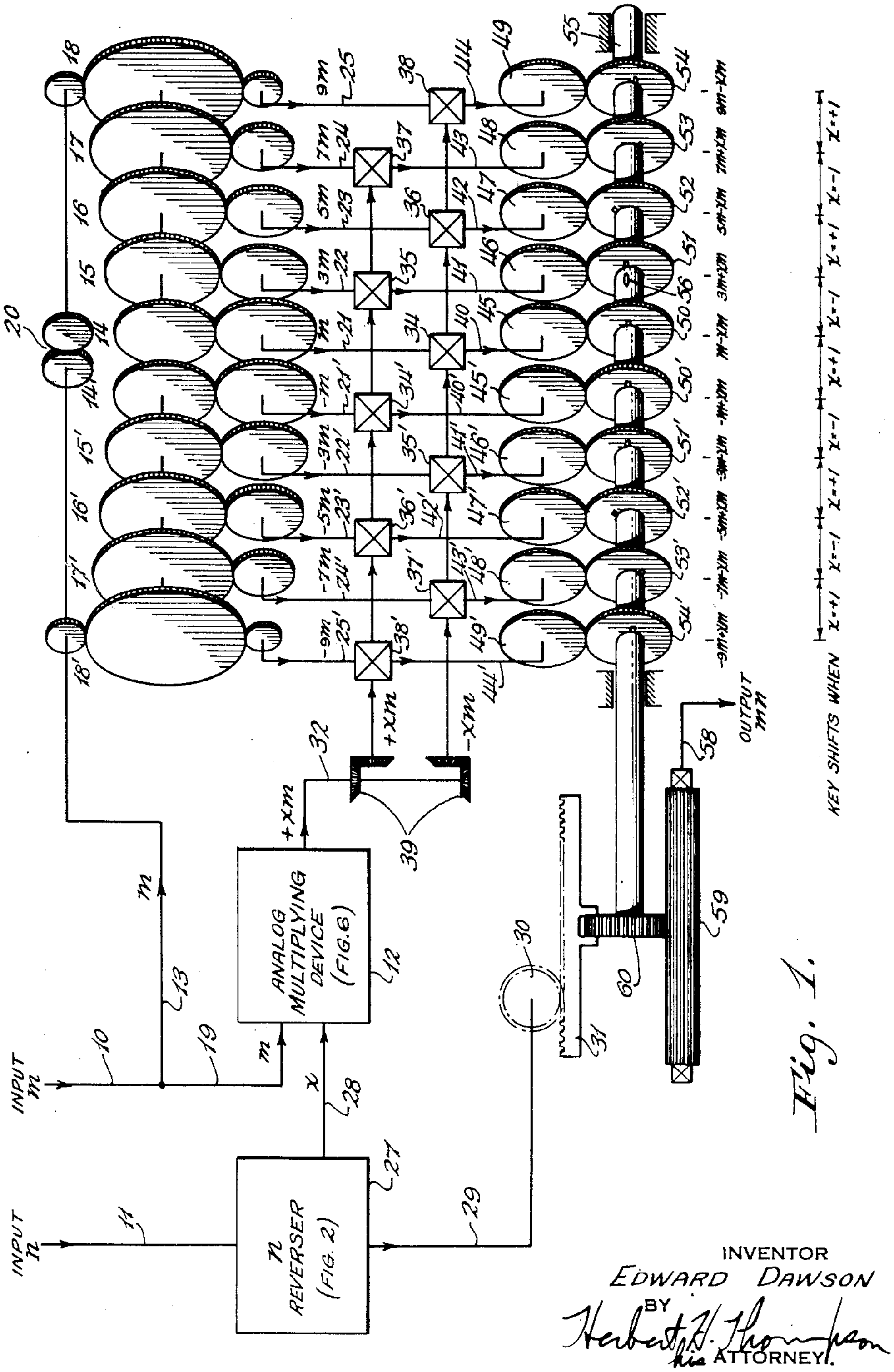

My invention relates generally to computing apparatus, and has reference more particularly to multiplying mechanisms.

In order to obtain more accurate results from an analog multiplying device, it is necessary to increase its physical dimensions or to improve the precision of its construction, but both of these methods of increasing the accuracy of an analog multiplier are limited in their practical applications. The attainment of extreme mechanical precision is opposed by high manufacturing costs, the difficulty of providing interchangeability of parts, deflections of the component parts, and thermal expansion thereof. On the other hand, when it is desired to secure high precision in the manufacture of an analog computing device by increasing its size, the space requirement and weight thereof often tend to be greater than the specific application within a system will permit. In general, therefore, it is not possible to construct a computing mechanism based purely on conventional analog principles which will provide any desired degree of accuracy and therefore it is necessary in such a system to effect a compromise between the above conflicting considerations, i. e., accuracy, size, and manufacturing cost.

Because of these limitations of analog multipliers, it is necessary to use digital computing methods to obtain results of the desired degree of accuracy. However, the use of digital methods may necessitate the provision of an elaborate computing system containing an undesirable, large number of components so that a combined requirement for high accuracy in computing sizes may still not be satisfied. Moreover, the operation of digital computers is essentially discontinuous, consisting of a succession of individual steps, so that supplementary converting devices are necessary when it is desired to represent input and output quantities by continuously varying physical magnitudes such as shaft rotations or voltages.

The multiplying mechanism of my invention has been devised with all of the above disadvantages of prior mechanisms considered and the resulting mechanism not only possesses the basic features and advantages of an analog multiplier, but further includes features which greatly increase its accuracy to a degree heretofore unattainable.

It is a primary object of my invention, therefore, to provide a multiplying device which has extremely high accuracy and yet may be comparatively small in physical dimensions.

Another object of my invention is to provide a multiplying mechanism in which the inputs to a conventional analog multiplying device are recycled with continued increasing or decreasing of the factors represented thereby beyond the capacity of the analog multiplier, and then having the recycled product interpolated between predetermined discrete multiples of the factors, thereby providing a high degree of accuracy with a minimum size of equipment.

Still another object of my invention is to provide a multiplying mechanism for deriving the product of a pair of factors in which measures of the first factor and a portion of the second factor, less than a predetermined fraction of the second factor, are multiplied together, and in which the measure of the first factor is multiplied by the whole number of fractionate parts constituted in the second factor, and in which the products of both multiplications are added together.

A further object of my invention is to provide a multiplying mechanism for deriving a product of two input factors which comprises two multiplying means, the first of which provides a plurality of outputs each proportional to a discrete multiple of the first of the input factors, and the second of which provides an output proportional to a continuous product of the first of said factors times a fractionate part of the second of the factors, this continuous product having a value of sufficient magnitude to include the intervals between the discrete multiples provided by the first multiplying means, and a means for combining the results of both of said multiplications to provide an output proportional to the continuous product of the two factors.

Figure 2:
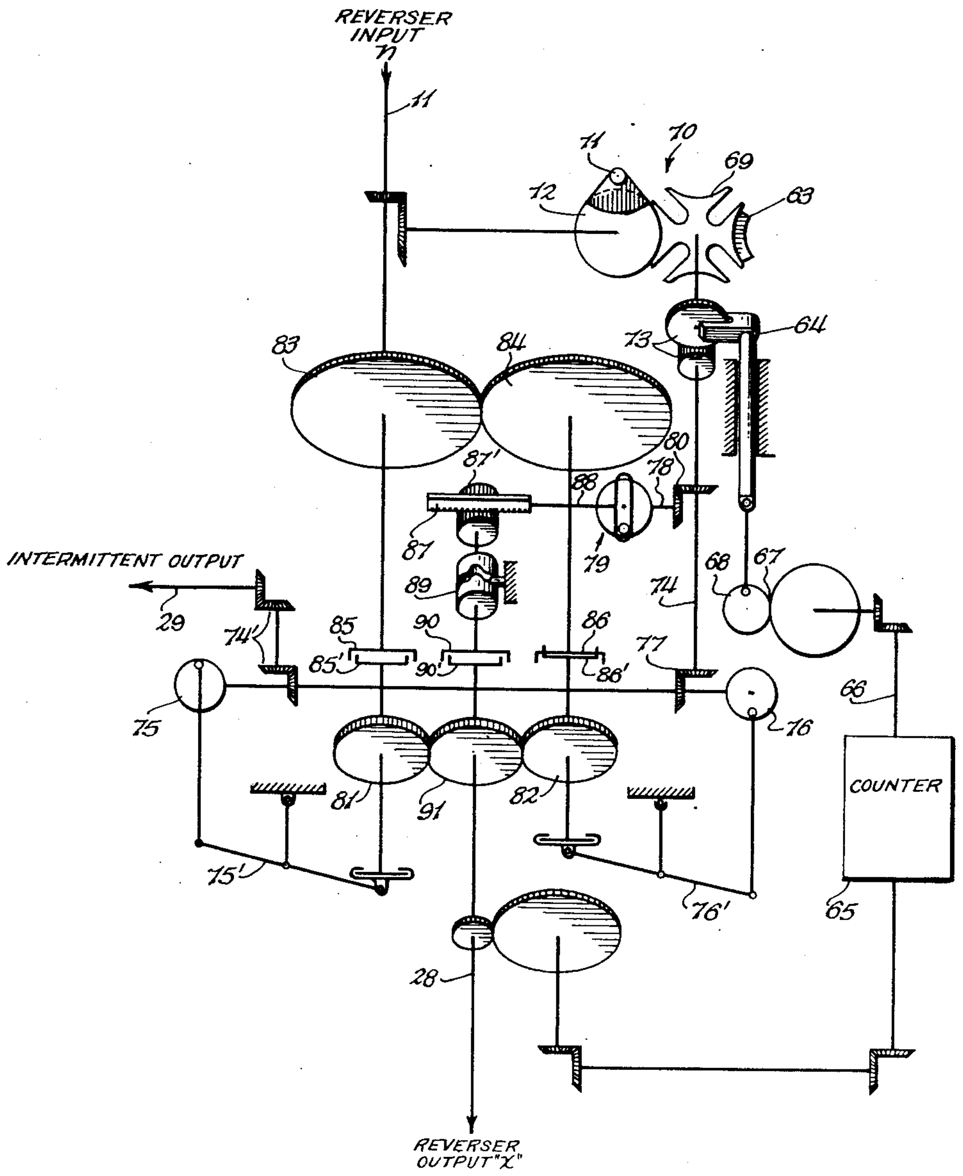
Figure 3:
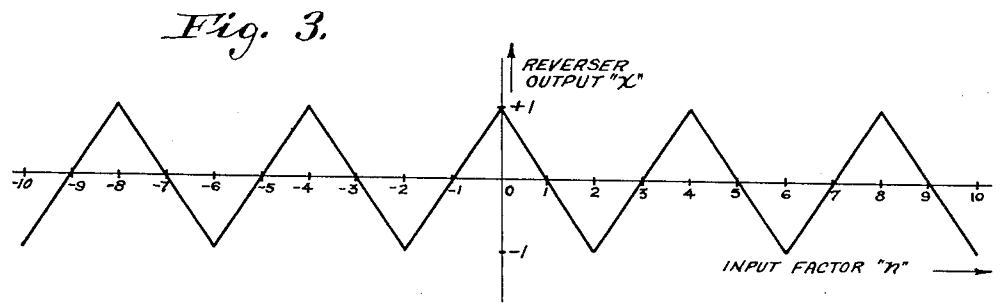
Figure 4:
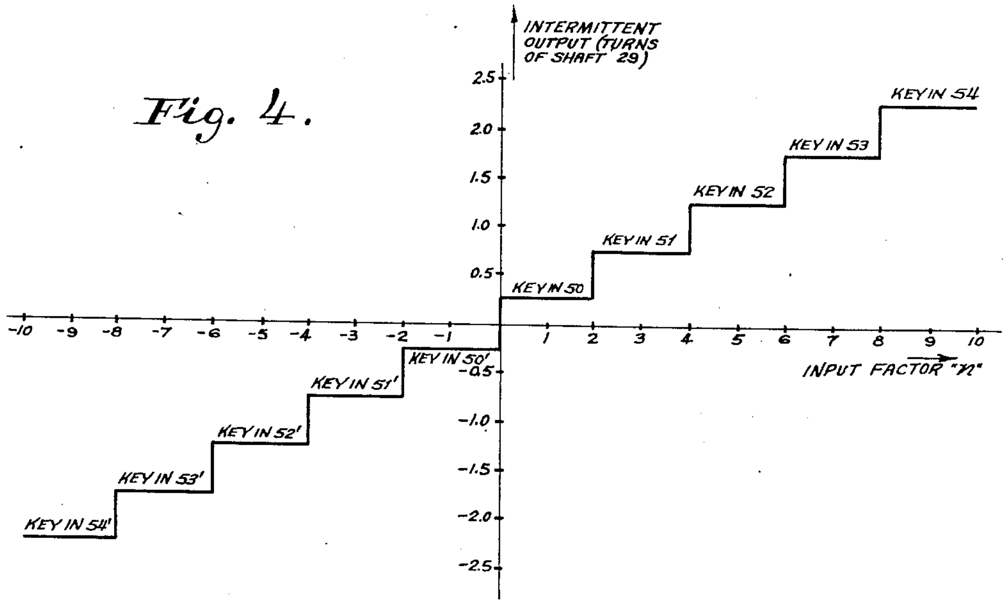
Figure 5:
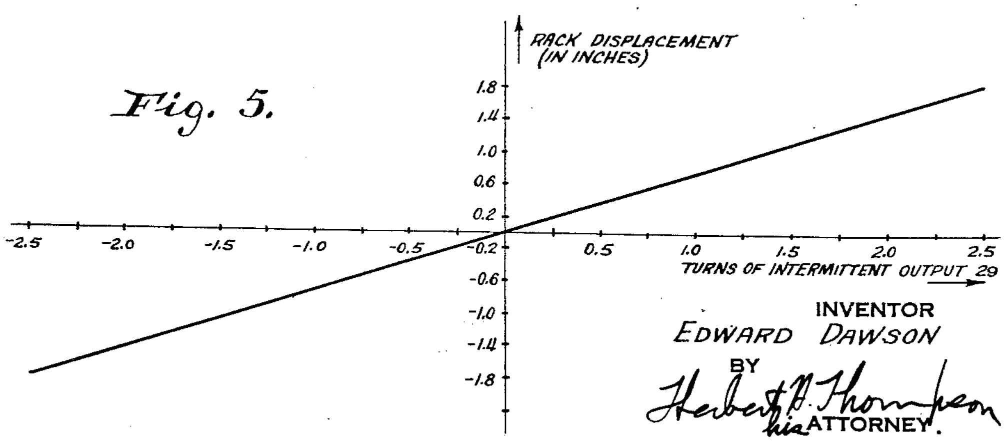
Figure 6:
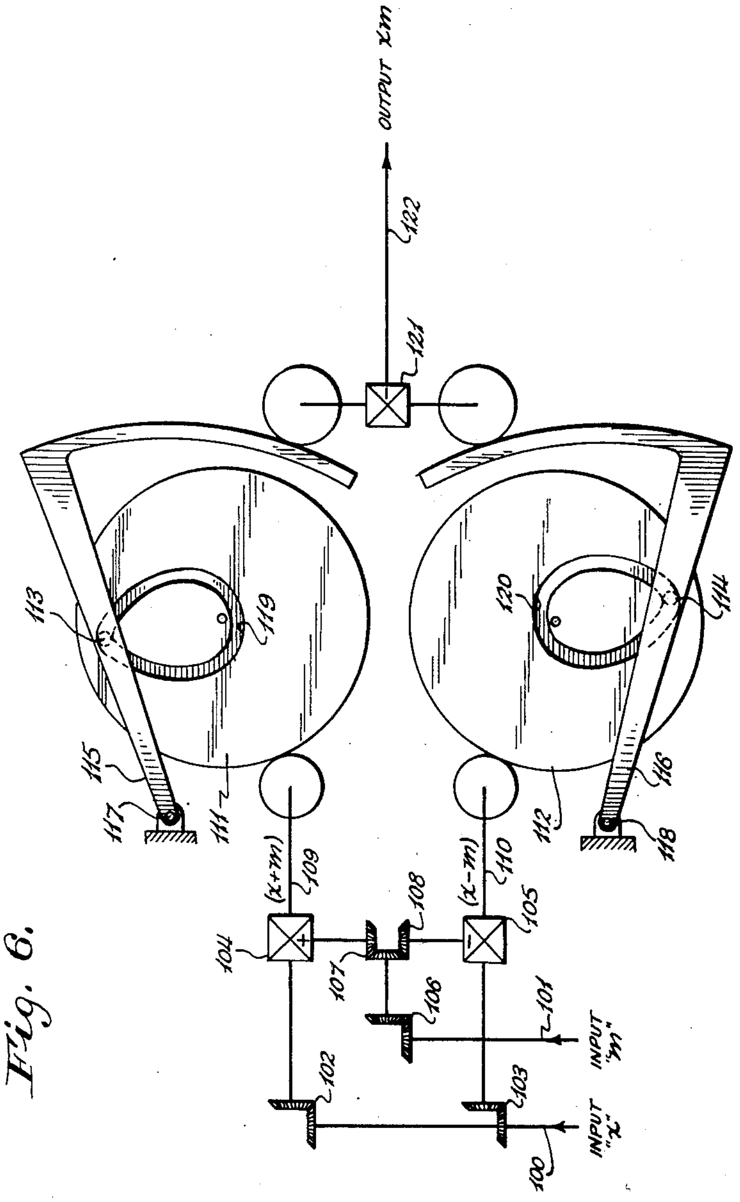
Figure 7:
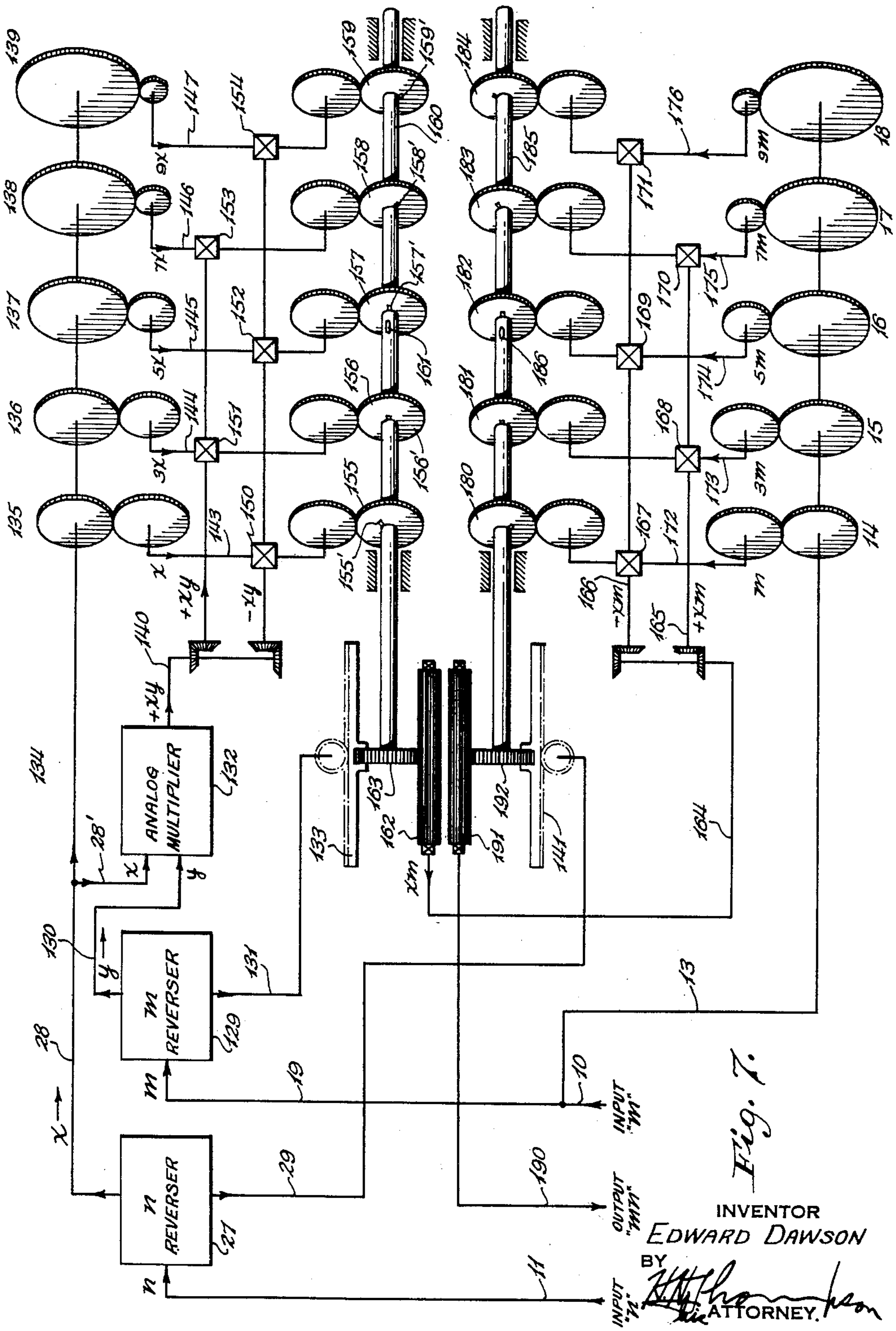

Other objects and advantages of my invention will become more apparent from the following detailed description of an illustrative embodiment thereof when considered with reference to the accompanying drawings, wherein:

Fig. 1 represents schematically a multiplying mechanism constructed in accordance with the teachings of my invention in which only one of the input factors is recycled;

Fig. 2 schematically represents one form of a reversing mechanism which may be employed in the apparatus of Fig. 1;

Fig. 3 graphically illustrates the reversing output of the reversing mechanism of Fig. 2;

Fig. 4 graphically illustrates the intermittent output of the reversing mechanism of Fig. 2 plotted as a function of the input factor $n$;

Fig. 5 graphically illustrates the displacement of the key shifting rack plotted as a function of the intermittent output of the reversing mechanism of Fig. 2;

Fig. 6 represents one form of an analog multiplying device which may be employed in the apparatus of Fig. 1; and Fig. 7 represents schematically a multiplying device constructed in accordance with the teachings of my invention in which both of the input factors are recycled.

Referring now to Fig. 1, the factors $m$ and $n$ which are to be multiplied together are represented as rotations of an $m$-input shaft 10 and an $n$-input shaft 11. These shafts may be shafts of a computing system in which the factors represented by the rotational position thereof are to be multiplied. In the embodiment illustrated in Fig. 1 it is assumed that the $n$-input shaft 11 requires a great number of rotations in representing the factor $n$, the number of rotations thereof being far in excess of the rotational limits or range of operation of one input of an analog multiplying device 12. The $m$-input shaft branches in two directions, one shaft 13 going to a plurality of multiplying means 14, 15, 16, 17 and 18, and the other shaft 19 going to the $m$-input of the analog multiplier device 12.

The input shaft 19 of the analog multiplier device 12 may be connected to the $m$-input shaft 10 through suitable reduction gearing (not shown) so that the rotational limits thereof do not exceed the limits or range of operation of the multiplying device.

The plurality of multiplying means 14'—18' are rotated in a direction opposite to the rotation of the plurality of multiplying means 14—18, through gear coupling 20. The outputs of the multiplying means 14'—18' are employed when the value represented by the input factor $n$ is negative.

The plurality of multiplying means 14—18, 14'—18', which, in the embodiment illustrated, comprises a plurality of gear connections of successively increasing speed ratios, provides a plurality of discrete multiples of the factor represented by the $m$-input shaft 10. These discrete multiples, in the embodiment illustrated, are $m$, $3m$, $5m$, $7m$ and $9m$ *and* $-m$, $-3m$, $-5m$, $-7m$, and $-9m$ represented respectively by a plurality of multiplier means output shafts 21, 22, 23, 24 and 25, and 21', 22', 23', 24' and 25', respectively. The plurality of discrete multiple outputs are used in a manner to be hereinafter more fully described. The $n$-input shaft 11 is coupled with a converting means or modifying means 27 which, in the illustrated embodiment of my invention, comprises a reversing mechanism which provides two outputs, one being a modified version of the input factor $n$, i. e., a reversing function thereof which successively increases and decreases linearly between predetermined rotational limits. This one output of the reversing mechanism 27 may be designated as a "sawtooth output" or "reversing output" having a value represented by the factor $x$, graphically illustrated in Fig. 3. From the graph of Fig. 3 it will be noted that the sawtooth output $x$ varies linearly between values of $+1$ and $-1$, with reversals in slope at every even value of the input factor $n$. The mechanical details of a reversing mechanism which may be employed in carrying out the principles of my invention is illustrated in Fig. 2 and will be discussed in more detail below. It will be understood that the crests of the sawtooth output function $x$ are not perfectly sharp, but are slightly rounded in order to permit a reversal to occur with smoothness and without mechanical shock or impact. The sawtooth output $x$ appears as a rotation of output shaft 28 first in one direction and then in the opposite direction within predetermined rotational limits in each direction. This output 28 is transmitted to the analog multiplier unit 12.

The other output of reverser mechanism 27 may be termed the "intermittent output" which, in the illustrated embodiment of the reverser of Fig. 2, is the rotation of the Geneva mechanism, which output appears on shaft 29 and rotates through a definite angle whenever a reversal occurs, in the present illustrative embodiment, through an angle of 180° at each even integral value of $n$. (See the graphs of Figs. 3 and 4.) Intermittent output shaft 29 rotates a pinion 30 in mesh with a rack 31 at the predetermined limits of each multiplying cycle of the analog multiplier $x$-scale. The purpose of the rack and pinion 31, 30 will be hereinafter more fully described.

An analog multiplying device which may be employed in the illustrated embodiment of my invention is shown in detail in Fig. 6 and a complete description thereof will be hereinafter set forth. For the present, however, it will be pointed out that the output shaft 32 of the multiplier 12 is rotated in accordance with the product $xm$. This is the continuous analog product which is to be interpolated between the discrete multiples of the input factor $m$ that are represented by the rotational positions of the plurality of multiplier means output shafts 21—25 and 21'—25'.

Consideration will now be given to the manner in which the continuous analog product $xm$ is interpolated between the discrete multiples of $m$. The output shafts 21—25, 21'—25', which respectively represent the values $m$, $3m$, $5m$, $7m$ and $9m$, and $-m$, $-3m$, $-5m$, $-7m$, and $-9m$ are algebraically combined by means of differentials 34, 35, 36, 37 and 38, and 34', 35', 36', 37' and 38', with the output $xm$ of the analog multiplier 12 which rotates the spiders of the differentials in opposite directions for positive and negative values of $xm$ respectively, through bevel gearing 39. In other words, the output 32 of the multiplying device 12 will be algebraically combined with alternate outputs of the plurality of multiplying means 14—18, 14'—18' in a sense corresponding to the sense of the product $xm$ and the output 32 of the multiplying device 12 will be algebraically combined with the remainder of the outputs of the plurality of multiplying means 14—18, 14'—18' in a sense opposite to the sense of the product $xm$. The algebraic sums or outputs of the differentials 35—38, 35'—38' are represented by rotation of differential output shafts 40, 41, 42, 43 and 44, and 40', 41', 42', 43', and 44', respectively and rotate gears 45, 46, 47, 48 and 49, and 45', 46', 47', 48', and 49', respectively, which in turn engage output gears 50, 51, 52, 53 and 54 and 50', 51', 52', 53' and 54', respectively, which are rotatably mounted on an output member or sliding output shaft 55. Output shaft 55 has a tapered key 56 which is adapted to selectively engage suitable slots or keyways in each of the output gears 50—54, 50'—54', in accordance with the translational position of rack 31.

As the value of the input factor $n$ is increased or decreased from zero, the intermittent output 29 of the reverser 27 rotates through 180° at each even integral value of $n$ causing the rack 31 to be displaced, thereby translating key 56 from engagement with one of the output gears 50—54, 50'—54' to another. The rotational position of the sliding output shaft 55 is therefore successively equal to the rotational positions of each of the output gears, which are, $m-xm$, $3m+xm$, $5m-xm$, $7m+xm$ and $9m-xm$ for positive values of $n$, and $-m+xm$, $-3m-xm$, $-5m+xm$, $-7m-xm$, and $-9m+xm$ for negative values of $n$.

The action of the key shifting rack 31 will become more evident by referring to the graphs of Figs. 3, 4 and 5. Fig. 3 represents the reversing output factor $x$ plotted as a function of the input factor $n$, Fig. 4 illustrates the intermittent output 29 of the reversing mechanism 27 also plotted as a function of input factor $n$, and Fig. 5 represents the displacement of rack 31 as a function of the intermittent output 29 of the reverser 27. From an inspection of these graphs it will be evident that a reversal of function $x$ occurs at each even integral value of $n$ (Fig. 3) at which time intermittent output shaft 29 rotates through 180° (Fig. 4). Such rotation produces a displacement of rack 31 to the right of, for example, 0.4 inch (Fig. 5). Thus, when the input factor $n$ increases from a value, for example, of $n=0$ to a value of $n=2$, the rack 31 is in such position that the key 56 is in the keyway of gear 50, therefore producing a rotation of the sliding output shaft 55 proportional to the product $m-xm$. The notation "Key in 50," "Key in 51," etc. appearing on the graph of Fig. 4, is intended to indicate, with reference to the notations in Fig. 1, the product which is being delivered by the sliding output shaft 55 of the multiplying mechanism. During this interval, i. e., the interval between the values $n=0$ and $n=2$, the output shaft 29 will remain stationary and the rack 31 will remain at the above position. However, when the input factor $n$ increases from a value of 2 to 4 (Fig. 3) the value of $x$ will increase from $-1$ to $+1$ passing through zero when $n$ equals 3. At the reversal i. e., when $n=2$, the intermittent output shaft 29 will rotate through 180° (Fig. 4) thereby shifting rack 31 further to the right causing the key 56 to be transferred from engagement with output gear 50 to engagement with output gear 51. At the completion of the reversal, intermittent output shaft 29 will again be stationary causing rack 31 to remain stationary so that as the value of $n$ increases from 2 to 4 the rotation of output gear 51 will be equal to the product $3m+xm$. In the illustrated embodiment of my invention, the graphs indicate that this action continues through positive values of input factor $n$ up to the value $n=10$.

Consideration will now be given to the actuation of rack 31 when $n$ decreases in value from $n=0$ to $n=-10$. When the input factor $n$ decreases from the value of 0 to $-2$ the value of $x$ decreases from $+1$ to $-1$ but the slope of the line representing $x$ is opposite to the slope of the line when $n$ increases from zero to $+2$. From an inspection of the graph of Fig. 5, it will be observed that the displacement of rack 31 will be exactly equal to what it was when the value of $n$ increased from $n=0$ to $n=+2$, but the rotation of the intermittent output shaft 29 will be in the opposite direction and therefore the translation of the rack 31 will be to the left, thus translating key 56 from engagement with the output gear 50 to output gear 50'. Therefore, when $n$ decreases in value from $n=0$ to $n=-2$ the product output of the sliding output shaft 55 will be equal to $-m+xm$ (Fig. 4). As $n$ decreases further in value i. e., from $n=-2$ to $n=-4$, $x$ will increase in value from $-1$ to $+1$ passing through 0 at the value $n=-3$. However, at $n=-2$ the intermittent output shaft 29 will again rotate through 180° thereby shifting rack 31 further to the left so that key 56 will be transferred from engagement with output gear 50' to output gear 51', where the rack will remain until $n$ equals $-4$. During this interval the output shaft 55 will be rotated in accordance with the product $-3m-xm$. In the illustrated embodiment of my invention, this action will continue for negative values of $n$ from $n=0$ to $n=-10$.

From the above discussion it will be seen that the integral multiples provided by the multiplying means 14—18 will provide a plurality of discrete multiple outputs of successively increasing or decreasing rotational values, and that the product $xm$ is algebraically combined with each of these multiples. However, the rack and pinion 31, 30, which is controlled by predetermined values of $n$, determines which product appearing on output shafts 40—44, 40'—44' will be connected to rotate the output shaft 55. In this manner the factor $n$ will be included in the rotation of the output shaft 55 and its rotation therefore will equal to the product $mn$.

This continuous product $mn$ may be coupled with a further output shaft 58 through an elongated pinion 59 engaging spur gear 60 mounted on the end of sliding output shaft 55 which, in turn, is in engagement with the rack 31.

As above indicated with respect to Fig. 5, in a practical application of the multiplying mechanism of the present invention the intermittent translational travel of the rack 31 may be, for example, 0.4 inch per step of 180° input rotation. Under such conditions, the output gears 50—54, 50'—54' would be located at 0.4 inch center to center distance measured along the sliding output shaft 55. The width of each of these gears, measured at the hub, would be 0.4 inch, less a small amount for running clearance, so that the idler gears form a compact assembly instead of being widely separated as shown in the drawings for the purposes of illustration.

It will be noted that the input $n$, as it continuously increases or decreases, is converted or modified by the reversing mechanism 27, to a successively increasing and decreasing function thereof, the rotation of the output shaft representing this function not exceeding the range of operation of the $x$-scale of the multiplying device 12, and that this function is multiplied with the other input factor $m$ to provide an incremental product $xm$. However, the $m$-input is simultaneously multiplied in large steps to provide outputs proportional to discrete multiples thereof. Thereafter the incremental product $xm$, provided by the analog multiplier 12, is interpolated by addition and subtraction between the discrete multiple outputs of $m$ to provide a continuous product of the two input factors $m$ and $n$. Of the total turns of the output shaft 55, which represents the product $xm$, only a very small fraction thereof is contributed by the analog multiplier 12, the rest being obtained from the continuously rotating gears of the plurality of multiplying means. Thus, the accuracy of the analog multiplier may be increased many times by the recycling mechanism above described.

The operation of the multiplying mechanism illustrated in Fig. 1 will be better understood by considering a few numerical examples. It will be assumed that initially $m=0$ and $n=0$. From an inspection of the graph of Fig. 3, it will be seen that for the condition $n=0$, the value of $x$ is +1, hence the initial value of the output, $xm$, of the analog multiplier 12 is zero. Moreover, under such conditions the output, at shaft 21, of the first of the plurality of multiplying means 14—18 equals zero and therefore the rotational position of output shaft 55 represents a zero output. Now assume that $m$ increases to, say, a value of +1; the value of $n$ remaining zero. Under these conditions the output $xm$ of multiplier 12 is equal to +1 and the output of the multiplying means 14 at shaft 21 also equals +1. However, since the output of multiplier 12 is reversed in sign by one of the pairs of bevel gears 39 before it is algebraically added, at differential 34, to the output of multiplying means 14, the rotation of output shaft 40 still represents a value of zero, and the value represented by output shaft 55 is also zero. Now, if the value of $m$ remains +1 and the value of $n$ also increases to +1, the value of $x$ is equal to 0, as illustrated by the graph of Fig. 3, and the output $mx$ of the multiplier 12 will decrease to zero. Therefore, since the output of the first multiplying means 14 remains equal to +1, the rotational position of the output shaft 40 of the differential 34 will equal +1. Assume now that the value of $m$ remains equal to +1 but the value of $n$ is increased to a value of 1.5. In such case $x$ becomes equal to −0.5 (Fig. 3) and the output $xm$ of the multiplier device 12 will equal −0.5, since $m$ equals +1. Since the output $m$ of the multiplying means 14 at shaft 21 is +1, and the product $xm$ is −0.5, the output 40 of the differential 34 is equal to $m-xm$ or 1− (−0.5) or +1.5. This is the product which appears as a rotation of output shaft 55. Now let $n$ increase to a value of +2.5 and the value of $m$ equals +0.76. From the graph of Fig. 3, when $n=+2.5$, $x=-0.5$. When, in increasing to 2.5, the value of $n$ is equal to 2, a reversal of the reverser 27 occurs as hereinabove described, thereby recycling the output of the analog multiplier 12 and at the same time shifting the key 56 from engagement with idler gear 50 to engagement with idler gear 51. The output $xm$ of the analog multiplier 12 is then equal to (−0.5)(+0.76)=−0.38. However the output of multiplying means 15 which drives idler gear 51 through shaft 22, differential 35, shaft 41, and gear 46, is equal to the product of $m$ and the discrete factor +3, and its output shaft 22 is rotated in proportion to $+3m$. Since the output $xm$ of the multiplier device 12 is applied to the differential 35 without a reversal of sign, output of differential 35, at shaft 41, will represent the value $3m+xm$ or $$(3)(0.76)+(-0.5)(0.76)=1.90$$

This value is represented by the rotational position of output shaft 55 since the key 56 is now in engagement with the idler gear 51.

Let us consider another example in which the values of the factors $m$ and $n$ are fractionate numbers. Assume that the factor $n$ increases to a value of +8.3 and that the value of $m$ equals +0.76. From an inspection of the graph of Fig. 3, representing the output of the reverser 27, it is apparent that when the value of $n$ equals +8.3, $x$ is equal to +0.7. Since the input $x$ to the multiplier 12 is equal to +0.7 and the value of $m$ is equal to +0.76, the output $mx$ of the multiplying device 12 has a value of +0.7 times +0.76 or +0.532. At the same time $m$ has been multiplied by the discrete factor +9 by the multiplying means 18, its output, at shaft 25, representing a value of $9m$ or +6.84. Since the output +0.532 of multiplying device 12 is reversed in sign before being algebraically added, at differential 38, to the output of multiplying means 18, the output of differential 38 will represent a value of $$6.84-0.532=6.308$$

This is the product which will appear as a rotation of differential output shaft 44, idler gears 49 and 54, and hence output shaft 55.

The above described sequence of operations will occur for both positive and negative values of inputs $m$ and $n$, but in the case of negative values, the rotations are reversed and the key 56, instead of being moved to the right will be moved to the left, thus coupling the sliding output shaft 55 with gears 45′—49′, differentials 34′—38′, and the plurality of multiplying means 14′—18′.

In the preceding discussion of the multiplying mechanism of my invention, I have referred generally to the reversing mechanism 27 in Fig. 1. This device is similar in principle to that described in my copending application Serial No. 103,465, filed July 7, 1949, for an Automatic Reversing Mechanism, and the mechanical arrangement illustrated in Fig. 2 of the present application is substantially identical to the arrangement of the reversing mechanism illustrated in Fig. 5 of this copending application. However, in order to further a better understanding of the present invention I will herein describe this mechanism in detail.

When the $n$-input shaft 11 of the multiplier is rotated continuously in either direction, the output shaft 28 undergoes the periodic reversals represented graphically in the diagram of Fig. 3. The reversing cycles are initiated by a counter mechanism 65 driven, through suitable gearing connections, by the output shaft 28 of the reverser. The main difference between the reverser disclosed in the above-mentioned application is that in the latter the counter is driven by rotation of the input shaft rather than rotation of the output shaft. The rotation of the counter output shaft 66, produced by the sawtooth rotation of its input, rotates through ±90° from its central or neutral position, and by means of a 2 to 1 gear ratio connection 67, turns a crank 68 through an angle of ±180°. This crank 68 is arranged to slide the star wheel 69, by means of sliding yoke 64, of a Geneva drive device 70 from its normal position of engagement with fixed detent member 63 which is axially displaced from rotating member 72, into axial alignment with the Geneva driving member 72. Thus, the rotation of the counter output shaft 66 through either plus or minus 90° will move star wheel 69 into an axial position where it will be actuated by a Geneva drive member 72. This axial shifting takes place when the pin 71 of member 72 is clear of star wheel 69. Drive member 72 is geared to rotate at one half the speed of the reverser input shaft 11. When the counter 65 has moved the star wheel 69 into engagement with drive member 72 the consequent rotation of star wheel 69 through an angle of 90° is multiplied to 180° by gears 73 of 2 to 1 ratio on the Geneva output 74. This 180° rotation is transmitted to cranks 75 and 76 through suitable bevel gearing 77, and to the input shaft 78 of a Scotch yoke device 79 through suitable bevel gearing 80. As will become apparent as a description of the reversing mechanism proceeds, a reversal of the reverser output shaft 28 is effected when this 180° rotation of Geneva output shaft 74 occurs. The intermittent rotational motion of shaft 74 is made available, by means of gearing 74', as an "intermittent output" at shaft 29.

The reverser output shaft 28 is normally driven by gears 81 or 82, which are driven by input gear 83 directly connected to input shaft 11, and oppositely rotating gear 84 in mesh therewith, through suitable jaw couplings 85 and 86 respectively. When a reversal takes place, drive of the output shaft 28 is shifted from gear 81 to gear 82, or vice versa, by engaging and disengaging the appropriate couplings 85, 85' and 86, 86'. If the drive operates through coupling 85, 85' at the beginning of the reversal, then coupling half 90 is made to match coupling half 90' in speed and in angle by the action of a rack and pinion drive 87, 87' driven by the output 88 of Scotch yoke 79. At the instant this action occurs, the drive to the output shaft 28 is shifted from coupling 85 to coupling 90, 90' by operation of crank 75, rocker arm 75' and cylindrical translating cam member 89. When the output 88 of Scotch yoke device 79 has moved the rack 87 to one of the extreme positions of its stroke, the output shaft 28, driven by coupling 90, 90', is brought to rest. Rack 87 then starts back towards its neutral position, and when the speeds and angles of coupling halfs 86 and 86' are equal, the drive to the output shaft 28 shifts from 90, 90' to 86, 86' by rotation of crank 76, rocker arm 76' and cylindrical translating cam member 89. The rack 87 then comes to rest at its neutral position and the output shaft 28 runs in the opposite direction. The counter output shaft 66 is thereupon turned in the opposite direction through 90°, thereby disengaging drive wheel 72 and star wheel 69, thus completing a reversing cycle.

In Fig. 6 I have schematically illustrated an analog multiplying device which is well suited to the multiplying mechanism of my invention. It is extremely simple both in operation and in construction. This multiplying device operates on the principle of prosthaepheresis using square functions in accordance with the equation:

$$4xm=(x+m)^2-(x-m)^2$$

In this multiplying device the input shafts 100 and 101, which correspond respectively with reverser output shaft 28 and $m$-input shaft 10 of Fig. 1, are rotated in proportion to the factors $x$ and $m$ respectively. Factor $x$ is supplied through suitable bevel gearing 102, 103 in a positive sense to a pair of input differentials 104 and 105, respectively. The other input $m$ is supplied positively to the differential 104 through bevel gearing 106 and 107 and negatively to the input of the other differential 105 through bevel gearing 106, and 108. The output of differential 104 therefore will appear as a rotation of shaft 109 proportional to the sum $(x+m)$ and similarly the output shaft 110 will be rotated in proportion to the quantity $(x-m)$. The differential outputs 109, 110 rotate a pair of flat disc members 111 and 112 respectively. Cam follower rollers 113 and 114 which are mounted on a pair of hinged sectors 115 and 116 respectively, are rotationally positioned about pivot points 117 and 118 respectively by cam grooves 119 and 120 cut in the flat discs 111 and 112 respectively. The cam grooves have a configuration such that as they are respectively rotated in proportion to the quantity $(x+m)$ and $(x-m)$ the follower sectors 115 and 116 are rotated in proportion to the quantities $(x+m)^2$ and $(x-m)^2$ respectively. The difference in rotation of sectors 115 and 116 is obtained by an output differential 121 having an output shaft 122 corresponding to shaft 32 of Fig. 1, which is rotated in accordance with the product $4xm$. In a practical application, the construction of this multiplying device can be made quite simple. The shafts for the various pinions, cams, and differentials can be supported by flat, parallel, side plates which are connected by and suitably attached to spacer blocks. The cams 111 and 112 may be duplicates and may be assembled back to back between the side plates and the sector gears 115 and 116, which may also be duplicates, may be suitably mounted for free rotation on shafts of the two input differentials and the free ends thereof may be supported by slots in the spacer blocks. The differentials 104 and 105 may be journaled between the side plates and instead of having output shafts connected to their spiders, as illustrated, suitable gear teeth may be provided directly on the surface of the spider which gear teeth may drivably engage the toothed periphery of cams 111 and 112. Similarly, the output differential 121 instead of having an output shaft 122, as illustrated, may also have gear teeth fabricated directly in the surface of the spider and an output pinion in mesh therewith.

In the above description of the multiplying device of my invention I have illustrated a mechanism in which the $x$-input of the basic multiplier or analog multiplier 12 is increased cyclically for continued increases in the value $n$ but in which the $m$-input is not recycled. In a practical application of the multiplier mechanism of my invention, it would be desirable to increase both scales of the analog multiplier, i. e., increase the accuracy of both factors $n$ and $m$. This may be accomplished by substituting for the analog multiplier 12 of Fig. 1, the entire recycling multiplier of Fig. 1 to obtain thereby a continuous product $xm$. In doing this the input $m$ is converted to a sawtooth function by a reversing mechanism which may be substantially identical to the $n$-reversing mechanism 27 of Fig. 1 and the scale factor of variable $m$ may be enlarged as many times as required. Such a system is schematically illustrated in Fig. 7.

In Fig. 7 the $m$ input 10 branches in two directions, one shaft 13 going to the plurality of multiplying means 14 through 18 and the other shaft 19, instead of going directly to the analog multiplier 12 as in Fig. 1 goes to an $m$-reversing mechanism 129. As before, the purpose of the multiplying means 14—18 is to provide a plurality of discrete multiples of the shaft rotation represented by the input factor $m$. The $m$-reverser 129 is substantially identical to the $n$-reverser 27 and produces a pair of outputs, one of which appears on output shaft 130 and is designated as the "sawtooth output $y$" and the other output appearing on shaft 131 which is designated as the "intermittent output." The sawtooth function $y$ is exactly the same as sawtooth function $x$ of Fig. 1 and varies linearly between values of +1 and −1 with reversals in slope at every even value of $m$. The sawtooth output $y$ appearing on shaft 130 is coupled with the $y$-input of an analog multiplying device 132 which may be identical to the multiplying device illustrated in Fig. 4. Again, the intermittent output 131 of the $m$-reverser rotates through an angle of 180° whenever a reversal occurs; that is, at each even integral value of *m*. This shaft translates the key shifting rack 133 at the limits of each cycle, or at the limits of the range of operation of the analog multiplier *y*-input.

Returning now to a consideration of the *n*-input, this input is transmitted by shaft 11 to the *n*-reverser 27 just as in Fig. 1. The sawtooth output of the *n*-reverser is designated as function *x* and appears as a rotation of shaft 28, as above, and branches in two directions, one of which goes, via shaft 134, to a second plurality of multiplying means 135, 136, 137, 138 and 139 and the other of which enters, by way of shaft 28', the analog multiplier device 132. The analog multiplier device 132 provides a rotation of its output shaft 140 which represents the product $xy$ of its two input factors. This is the continuous analog product which is to be interpolated between the discrete multiples of input factors *x* and *m*. The intermittent output 29 of the *n*-reverser 27 translates the lower key shifting rack 141 through 180° whenever sawtooth function *x* reverses.

Consideration will now be given to the manner in which the continuous analog product $xy$ is interpolated between the discrete multiples of function *x* which are provided by the upper set of multiplying means 135—139. As illustrated in Fig. 7, the upper set of multiplying means receive sawtooth output *x* and deliver five outputs $x$, $3x$, $5x$, $7x$ and $9x$ and are represented by rotations of a plurality of multiplying means output shafts 143, 144, 145, 146 and 147, respectively. These outputs are combined, by means of five differentials 150, 151, 152, 153 and 154 with the output $xy$ of the analog multiplier 132 which rotates the spiders of the differentials in proportion to $+xy$ or $-xy$. The sums of the outputs of the plurality of multiplying means and the output of the multiplier 132 are obtained from these differentials and rotate output gears or output members 155—159 on a sliding shaft 160 having a key 161 which is adapted to selectively engage key-ways 155'—159' in the respective output gears. As the value of the input factor *m* is increased or decreased, the intermittent output 131 of *m*-reverser 129 rotates through 180° at each integral even value of *m*, causing the key-shifting rack 133 to slide key 161 from one of the output gears 155—159 to another. The rotational position of the sliding shaft 160 is therefore successively equal to the rotational positions of each of the output gears, which are $x-yx$, $3x+yx$, $5x-yx$, $7x+yx$ and $9x-yx$. Thus the rotational position of the sliding output shaft 160 represents product $xm$.

As in the case of Fig. 1, a long, non-sliding, pinion 162 is rotated in proportion to the product $xm$ by the output gear 163 of the sliding output shaft 160, and this rotation is applied, through suitable shaft 164, as an input to drive the spider shafts 165 and 166 of a second group of five differentials 167, 168, 169, 170 and 171. These differentials algebraically combine the quantity $+xm$ or $-xm$ to the discrete multiple outputs $m$, $3m$, $5m$, $7m$ and $9m$ appearing as rotations of output shafts 172, 173, 174, 175 and 176, respectively of the plurality of *m* multiplying means 14, 15, 16, 17 and 18. The output shafts of the five differentials 167—171 drive idler gears 180, 181, 182, 183 and 184 on a second sliding output shaft 185 in proportion to the quantities $m-xm$, $3m+xm$, $5m-xm$, $7m+xm$ and $9m-xm$. The sliding output member or shaft 185 is provided with a key 186 and is positioned axially by key-shifting rack 141 driven from the Geneva output 29 of the *n*-reverser. In this way rotation of the second sliding output shaft 185 represents the product $mn$. This output appears as a rotation of shaft 190 by way of a long pinion 191 and meshing gear 192 fixed to the sliding output shaft 185.

The multiplying mechanism as illustrated in Fig. 7 will accept only positive values of the input factors *m* and *n*, the additional members required for accepting negative values being omitted for the sake of clarity. However, these additional members are fully described and illustrated in Fig. 1 and it is to be understood that they may be included in the mechanism of Fig. 7, if required.

The accuracy of the cyclic multiplier may be greatly increased beyond that of the analog multiplier which it contains, because the analog multiplier contributes only a small part of the total product, the greatest portion of the output turns being provided by the continuously rotating gears of the plurality of multiplying means. In a practical application, the accuracy of a multiplying mechanism embodying the principles of my invention is limited only by considerations of size, cost and the time required for deriving the product.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a multiplying mechanism comprising a first input member adapted to be actuated in accordance with a first factor, a second input member adapted to be actuated in accordance with a second factor, modifying means coupled with said first input member for producing an output proportional to a function of said first factor, the output thereof successively increasing and decreasing between predetermined limits, a multiplying device having one input connected to receive the output of said modifying means and the other input connected to said second input member, a plurality of multiplying means connected to the second input member for providing a plurality of outputs each proportional to a discrete multiple of the factor represented thereby, means for algebraically combining the output of said multiplying device with alternate outputs of said plurality of multiplying means in a sense corresponding to the sense of the output of said multiplying device, and means for algebraically combining the output of said multiplying device with the remainder of the outputs of said plurality of multiplying means in a sense opposite to the sense of the output of said multiplying device.

2. A multiplying mechanism comprising a first input member adapted to be actuated in accordance with a first factor, a second input member adapted to be actuated in accordance with a second factor, modifying means coupled with said first input member for producing an output proportional to a function of said first factor, the output thereof successively increasing and decreasing between predetermined limits, a multiplying device having one input connected to receive the output of said modifying means and the other input connected to said second input member, a plurality of multiplying means connected to the second input member for providing a plurality of outputs each proportional to a discrete multiple of the factor represented thereby, means for algebraically combining the output of said multiplying device with alternate outputs of said plurality of multiplying means in a sense corresponding to the sense of the output of said multiplying device, means for algebraically combining the output of said multiplying device with the remainder of the outputs of said plurality of multiplying means in a sense opposite to the sense of the output of said multiplying device, an output member, and means controlled by said modifying means for selectively coupling any one of said combining means with said output member.

3. In a multiplying mechanism comprising a first input member adapted to be actuated in accordance with a first factor, a second input member adapted to be actuated in accordance with a second factor, modifying means coupled with said first input member for producing an output proportional to a function of said first factor, the output thereof cyclically increasing and decreasing linearly between predetermined limits with continuous increasing of said first factor, a multiplying device having one input connected to receive the output of said modifying means and the other input connected to said second input member, a plurality of multiplying means connected to the second input member for providing a plurality of outputs each proportional to a discrete multiple of the factor represented thereby, means for algebraically combining the output of said multiplying device with alternate outputs of said plurality of multiplying means in a sense corresponding to the sense of the output of said multiplying device, and means for algebraically combining the output of said multiplying device with the remainder of the outputs of said plurality of multiplying means in a sense opposite to the sense of the output of said multiplying device.

4. A multiplying mechanism comprising a first input member adapted to be actuated in accordance with a first factor, a second input member adapted to be actuated in accordance with a second factor, modifying means coupled with said first input member for producing an output proportional to a function of said first factor, the output thereof cyclically increasing and decreasing linearly between predetermined limits with continuous increasing of said first factor, a multiplying device having one input connected to receive the output of said modifying means and the other input connected to said second input member, a plurality of multiplying means connected to the second input member for providing a plurality of outputs each proportional to a discrete multiple of the factor represented thereby, means for algebraically combining the output of said multiplying device with alternate outputs of said plurality of multiplying means in a sense corresponding to the sense of the output of said multiplying device, means for algebraically combining the output of said multiplying device with the remainder of the outputs of said plurality of multiplying means in a sense opposite to the sense of the output of said multiplying device, an output member, and means controlled by said modifying means for selectively coupling any one of said combining means with said output member at each increase or decrease of the output of said modifying means.

5. A multiplying mechanism comprising, a first input member adapted to be actuated in accordance with a first factor, a second input member adapted to be actuated in accordance with a second factor, converting means coupled with said first input member for producing an output proportional to a predetermined function of said first factor, the output thereof cyclically increasing and decreasing linearly between predetermined limits, a multiplying device having one input connected to receive the output of said converting means and the other input connected to said second input member, a plurality of multiplying means connected to said second input member for providing a plurality of outputs proportional to discrete multiples of the factor represented thereby, means for algebraically combining the output of said multiplying device with alternate outputs of said plurality of multiplying means in a sense corresponding with the sense of the output of said multiplying device, means for algebraically combining the output of said multiplying device with the remainder of the outputs of said plurality of multiplying means in a sense opposite to the sense of the output of said multiplying device, a plurality of output members coupled with the outputs of said combining means, an output for said multiplying mechanism, and means controlled by said converting means for selectively engaging any one of said plurality of output members with the output of said multiplying mechanism.

6. In a system for multiplying a pair of factors comprising a first input member adapted to be actuated in accordance with a first of said factors, a second input member adapted to be actuated in accordance with the second of said factors, a reversing mechanism coupled with said first input member for producing an output proportional to a reversing function of said first factor, said reversing function increasing and decreasing linearly between predetermined limits with continued increasing of said first factor, a multiplying device having one input connected to receive said reversing function and the other input connected to said second input member, the range of operation of said multiplying device as to said one input being less than the maximum range of actuation of said first input member but not exceeding the limits of said reversing function, a plurality of multiplying means connected to the second input member for providing a plurality of outputs each proportional to a discrete multiple of the factor represented thereby, means for algebraically combining the output of said multiplying device with alternate outputs of said plurality of multiplying means in a sense corresponding with the sense of the output of the said multiplying device, means for algebraically combining the output of said multiplying device with the remainder of the outputs of said plurality of multiplying means in a sense opposite to the sense of the output of said multiplying device, an output member, and means actuated during each reversal of said reversing mechanism for selectively engaging any one of said combining means with said output member.

7. In a system for multiplying a pair of factors comprising a first input member adapted to be actuated in accordance with a first of said factors, a second input member adapted to be actuated in accordance with the second of said factors, a reversing mechanism coupled with said first input member for producing an output proportional to a reversing function of said first factor, said reversing function increasing and decreasing linearly between predetermined limits with continued increasing of said first factor, a multiplying device having one input connected to receive said reversing function and the other input connected to said second input member, the range of operation of said multiplying device as to said one input being less than the maximum range of actuation of said first input member but not exceeding the limits of said reversing function, a plurality of multiplying means connected to the second input member for providing a plurality of outputs each proportional to a discrete multiple of the factor represented thereby, a first group of differential means for algebraically combining the output of said multiplying device with alternate outputs of said plurality of multiplying means in a sense corresponding with the sense of the output of said multiplying device, a second group of differential means for algebraically combining the output of said multiplying device with the remainder of the outputs of said plurality of multiplying means in a sense opposite to the sense of the output of said multiplying device, an output member, and means actuable during each reversal of said reversing mechanism for selectively coupling the output of any one of said differential means with said output member.

8. A multiplying mechanism comprising a first input shaft adapted to be rotated in accordance with a first factor, a second input shaft adapted to be rotated in accordance with a second factor, a reversing mechanism coupled with said first shaft and having an output shaft rotatable in accordance with a continuously reversing function of said first factor, said output shaft successively rotating first in one direction and then in the opposite direction between predetermined rotational limits with continuous rotation in one direction of said first input shaft, a multiplying device coupled with said reversably rotating shaft and said second input shaft and having an output shaft rotatable in accordance with the product thereof, the range of operation of said multiplying device as to rotational output of said reversing mechanism being less than the maximum range of rotation of said first input shaft but greater than the rotational limits of the output shaft of said reversing mechanism, a plurality of gear connections coupled with the second input shaft having a plurality of output shafts, the rotational output of each being proportional to a discrete multiple of the factor represented by said second input shaft, a first group of differentials for algebraically combining the rotational output of said multiplying device with alternate outputs of said gear connections in a sense corresponding with the sense of the output of said multiplying device, a second group of differentials for algebraically combining the rotational output of said multiplying device with the remainder of the outputs of said gear connections in a sense opposite to the sense of the output of said multiplying device, a plurality of output members driven in accordance with the output of said differentials, an output shaft adapted to be rotated in accordance with the product of said first and second factors, and means operable during each reversal of said reversing mechanism for selectively engaging any one of said plurality of output members with said last-mentioned output shaft.

9. A multiplying mechanism as set forth in claim 8 in which the plurality of output members are rotatably mounted on said output shaft, a key secured to said output shaft and adapted to be selectively engaged with any one of said output members, and the means controlled by said reversing mechanism comprises a rack and pinion actuated during each reversal of said reversing mechanism for shifting said key from engagement with one of said plurality of output members into engagement with another of said plurality of output members.

10. In a multiplying mechanism comprising a first input member adapted to be actuated in accordance with a first factor, a second input member adapted to be actuated in accordance with a second factor, first and second modifying means coupled with said first and second input members respectively for producing outputs proportional to a function of said first and second factors respectively, the outputs thereof successively increasing and decreasing between predetermined limits, a multiplying device having one input connected to receive the output of said first modifying means and the other input connected to receive the output of said second modifying means, a first plurality of multipying means connected to the output of said first modifying means for providing a first plurality of outputs each proportional to a discrete multiple of said modified factor, first combining means for algebraically combining the output of said multiplying device with alternate outputs of said first plurality of multiplying means in a sense corresponding with the sense of the output of said multiplying device and for combining the output of said multiplying device with the remainder of the outputs of said first plurality of multiplying means in a sense opposite to the sense of the output of said multiplying device, a first output member, means controlled by said second modifying means for selectively coupling any one of said first combining means with said first output member, a second plurality of multiplying means connected to the second input member for providing a second plurality of outputs each proportional to a discrete multiple of the factor represented thereby, second combining means for algebraically combining the product represented by said first output member with alternate outputs of said second plurality of multiplying means in a sense corresponding with the sense of said first output member and for algebraically combining the product represented by said first output member with the remainder of the outputs of said first plurality of multiplying means in a sense opposite to the sense of said first output member, a second output member, and means controlled by said first modifying means for selectively coupling any one of said second combining means with said second output member.

EDWARD DAWSON.

REFERENCES CITED

The following references are of record in the file of this patent:

UNITED STATES PATENTS

| Number | Name | Date |
|---|---|---|
| 1,912,857 | Pinkel et al. | June 6, 1933 |
| 2,472,097 | Doersam, Jr. | June 7, 1949 |

FOREIGN PATENTS

| Number | Country | Date |
|---|---|---|
| 340,013 | Great Britain | Dec. 12, 1930 |